(12) United States Patent
Baudu et al.

(10) Patent No.: US 11,524,641 B2
(45) Date of Patent: Dec. 13, 2022

(54) SYSTEM AND METHOD FOR THE AUTOMATIC ADJUSTMENT OF VEHICLE SEATS OF DIFFERENT TYPES

(71) Applicant: FAURECIA Sièges d'Automobile, Nanterre (FR)

(72) Inventors: Samuel Baudu, Boulogne Billancourt (FR); Laurent Chabert, Cerny (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 107 days.

(21) Appl. No.: 16/804,360

(22) Filed: Feb. 28, 2020

(65) Prior Publication Data
US 2020/0276949 A1    Sep. 3, 2020

(30) Foreign Application Priority Data

Mar. 1, 2019 (FR) ..................... 19 02145

(51) Int. Cl.
*B60R 16/037* (2006.01)
*B60N 2/00* (2006.01)
*B60N 2/02* (2006.01)

(52) U.S. Cl.
CPC ............ *B60R 16/037* (2013.01); *B60N 2/002* (2013.01); *B60N 2/0248* (2013.01)

(58) Field of Classification Search
CPC .................................................. B60R 16/037
See application file for complete search history.

(56) References Cited

U.S. PATENT DOCUMENTS

| 9,694,770 | B2 | 7/2017 | Tobin | |
|---|---|---|---|---|
| 2007/0038345 | A1 | 2/2007 | Heider | |
| 2012/0086249 | A1 | 4/2012 | Hotary | |
| 2015/0084985 | A1* | 3/2015 | Baudu | B60R 16/037 345/629 |
| 2015/0180710 | A1* | 6/2015 | Cazanas | H04L 67/306 709/221 |

FOREIGN PATENT DOCUMENTS

CN          203372086 U      1/2014

OTHER PUBLICATIONS

French Search Report for FR1902145, dated Nov. 27, 2019, BEt 190466, 9 pages, (No English translation available).

* cited by examiner

*Primary Examiner* — Sze-Hon Kong
*Assistant Examiner* — Ana D Thomas
(74) *Attorney, Agent, or Firm* — Barnes & Thornburg LLP

(57) ABSTRACT

A system and method for adjusting seats of different vehicles, wherein the vehicles comprise means for retrieving an identifier of a seat user, wherein the system comprises means for storing data of seat adjustments made by an identified user in a first vehicle which are associated with the user identifier, comprises means for transmitting the seat adjustment data of the first vehicle and user identifier data to a second vehicle of a different type than the first vehicle, and comprises means for converting seat adjustment data of the first vehicle into seat adjustment data of the second vehicle so as to offer the user similar comfort in vehicles of different types.

15 Claims, 5 Drawing Sheets

Figure 1:
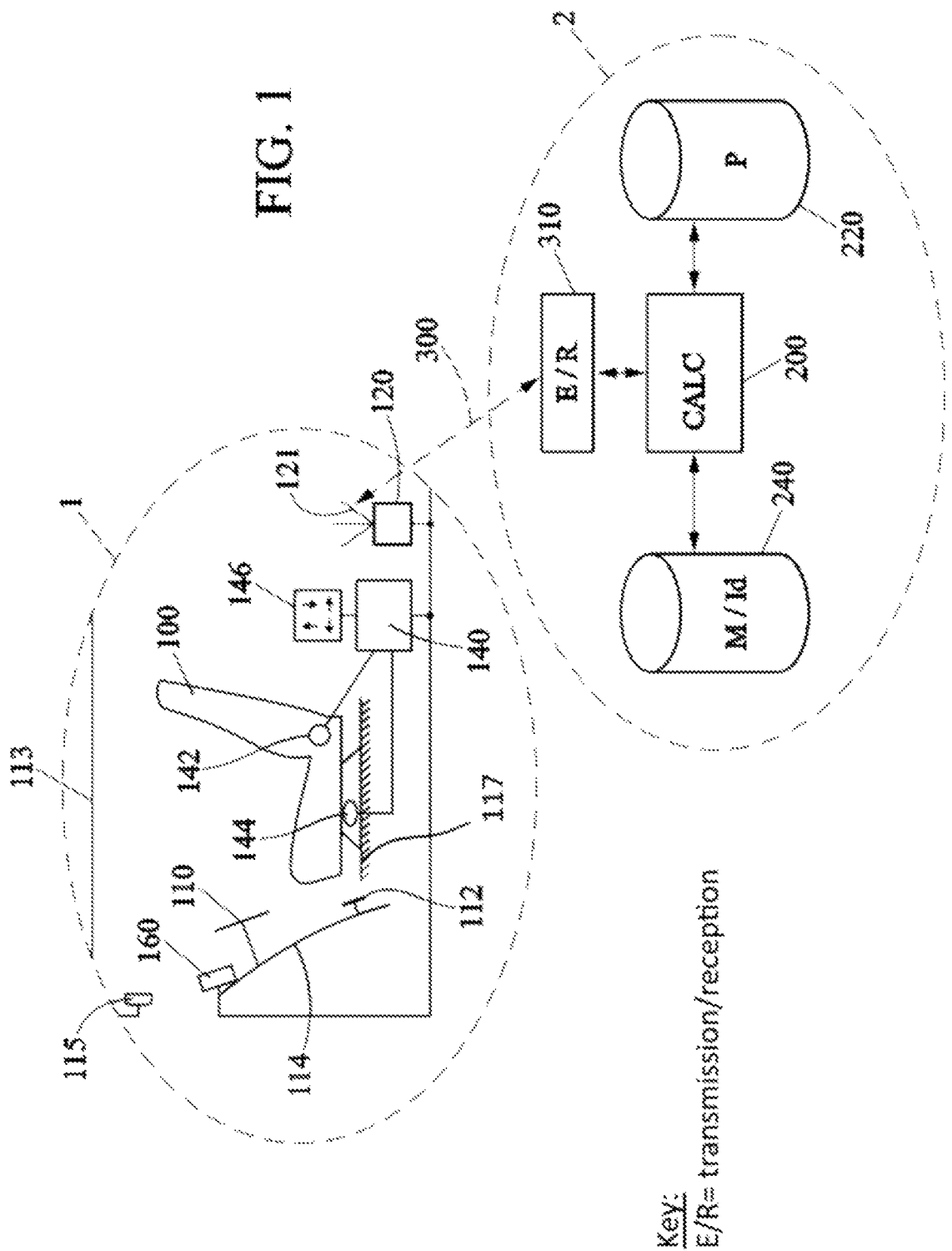

Key:
E/R= transmission/reception

Key:
REGLAGE= ADJUSTMENT

Key:
REGLAGE=ADJUSTMENT

SYSTEM AND METHOD FOR THE AUTOMATIC ADJUSTMENT OF VEHICLE SEATS OF DIFFERENT TYPES

PRIORITY CLAIM

This application claims priority to French Application No. FR 19 02145, filed Mar. 1, 2019, which is expressly incorporated by reference herein.

BACKGROUND

The present disclosure relates to the field of vehicle passenger compartments and associated comfort accessories and equipment.

SUMMARY

According to the present disclosure, a system and method which make it possible to adjust the seats of different vehicles based on the adjustments made by a user in a first vehicle is provided.

In illustrative embodiments, this is provided by the present disclosure which firstly provides a system for adjusting seats of different vehicles, wherein the vehicles comprise means for retrieving an identifier of a seat user, wherein the system comprises means for storing data of seat adjustments made by an identified user in a first vehicle which are associated with the user identifier, comprises means for transmitting the seat adjustment data of the first vehicle and user identifier data to a second vehicle of a different type than the first vehicle, and comprises means for converting seat adjustment data of the first vehicle into seat adjustment data of the second vehicle so as to offer the user similar comfort in vehicles of different types.

In illustrative embodiments, for the conversion, the system and method of the present disclosure use estimated morphology data calculated using dimensional data of the first vehicle and seat adjustment data of the first vehicle.

In illustrative embodiments, to do this, the system comprises means for calculating estimated morphology data of a user from dimensional data of the first vehicle and from seat adjustment data of the first vehicle;

means for storing the estimated morphology and user identifier data and for transmitting the estimated morphology and user identifier data to a second vehicle of a different type than the first vehicle, and conversion means for converting the estimated morphology data into seat adjustment data of the second vehicle based on dimensional data of the second vehicle.

In illustrative embodiments, to do this, the method comprises a step of calculating the estimated morphology data of the user from dimensional data of the first vehicle and seat adjustment data of the first vehicle, a step of storing the estimated morphology data, and a step of calculating seat adjustment data of the second vehicle based on the estimated morphology data and the dimensional data of the second vehicle.

In illustrative embodiments, the system comprises means for storing passenger compartment dimensional data of the vehicles, these data being used by the conversion means to calculate estimated morphology and seat adjustment data of the second vehicle based on the seat adjustment data of the first vehicle.

In illustrative embodiments, the dimensional data of the different vehicles comprise at least one different passenger compartment dimension.

In illustrative embodiments, the vehicles may comprise means for entering user morphological data, the seat adjustment of the first vehicle being carried out according to the user's morphological data.

In illustrative embodiments, the seat adjustment of the first vehicle may be carried out or modified manually by the user, in particular via a control module which actuates motors of the seat.

In illustrative embodiments, the vehicles comprise a seat adjustment computer connected to actuators and sensors of the seat, the computer comprising manual adjustment means and automatic adjustment means for the seat.

In illustrative embodiments, the vehicles may comprise a communication module for communicating with an external network and/or an external device.

In illustrative embodiments, the conversion means may comprise a computing unit associated with one or more storage units, for converting the seat adjustment data of the first vehicle into adjustment data for a seat of the second vehicle.

In illustrative embodiments, the storage unit is located in a server system remote from the vehicles.

In illustrative embodiments, the computing unit is implemented in a computing system remote from the vehicles.

In illustrative embodiments, the remote server system and the remote computing system are advantageously grouped together in a remote computer network connected to a communication network with communication units of the vehicles through which are transmitted vehicle identification data, user identification data, and the seat adjustment data, and the remote computing system transmits the seat adjustment data of the second vehicle to the second vehicle via the computer network and the communication network.

In illustrative embodiments, the storage unit comprises a database comprising the dimensional data representative of the passenger compartment and of seats of different types of vehicles, to enable adjustment of the seats of all of the vehicles based on the adjustment of a seat of a first vehicle.

In illustrative embodiments, the conversion means are integrated into a computer of the vehicle which enables local calculation of the adjustment data of a second vehicle.

In illustrative embodiments, a method for the automatic adjustment of seats of different vehicles, comprises:

a step of assigning an identifier to a user, for the first use of a first vehicle, a first step of entering the identifier, adjusting the seat, and storing the seat adjustment data, a step of transmitting the seat adjustment data obtained by the adjustment and the user identifier, to conversion means, a step of converting the seat adjustment data of the first vehicle into the seat adjustment data of the second vehicle, in the conversion means, a step of automatically adjusting the seat occupied by this user, based on the seat adjustment data of the second vehicle obtained from the conversion step.

In illustrative embodiments, the method comprises a step of recognizing the user identifier in the second vehicle before the adjustment of the seat of the second vehicle or before the conversion.

In illustrative embodiments, in the case of remote conversion means for the vehicles, the method comprises a step of transmitting the seat adjustment data of the second vehicle from the conversion means to the second vehicle.

In illustrative embodiments, in the case where the conversion means are internal to the vehicles, this step is an internal step where the data are transmitted from the internal conversion means to the seat adjustment means of the vehicles.

In illustrative embodiments, the method may comprise a step of calculating seat adjustment data of the second vehicle based on the seat adjustment data of the first vehicle via a calculation program in the conversion step.

In illustrative embodiments, the calculation step may in particular take into account dimensional data of the passenger compartment of the first vehicle and dimensional data of the passenger compartment of the second vehicle, in order to calculate seat adjustment data of the second vehicle based on seat adjustment data of the first vehicle.

In illustrative embodiments, to do this, the calculation step may calculate estimated morphology data based on the passenger compartment dimensional data and the seat positioning data of the first vehicle, these estimated morphology data enabling, with the passenger compartment data of the second vehicle, the calculation of the seat positioning data of the second vehicle.

In illustrative embodiments, the conversion step may also be done based on data conversion tables.

In illustrative embodiments, the method may in particular comprise a recognition of the user identifier and a retrieval of the estimated morphology of the user from a second database, a retrieval of the dimensional parameters of the second vehicle from a first database, and a second step of calculating seat adjustment parameters adapted to the second vehicle by means of a calculation program based on the estimated morphology of the user and the dimensional parameters of the second vehicle.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
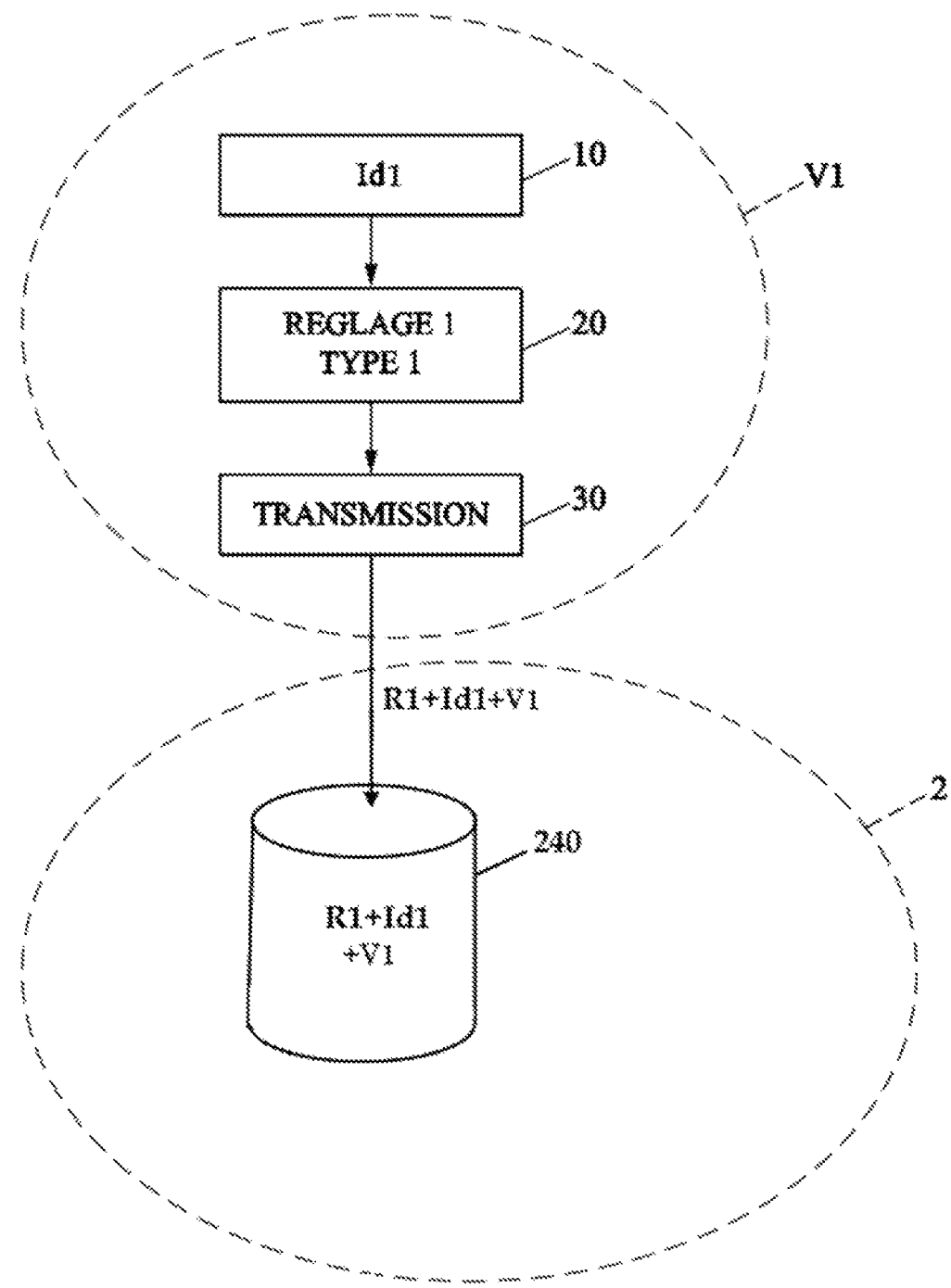
Figure 3:
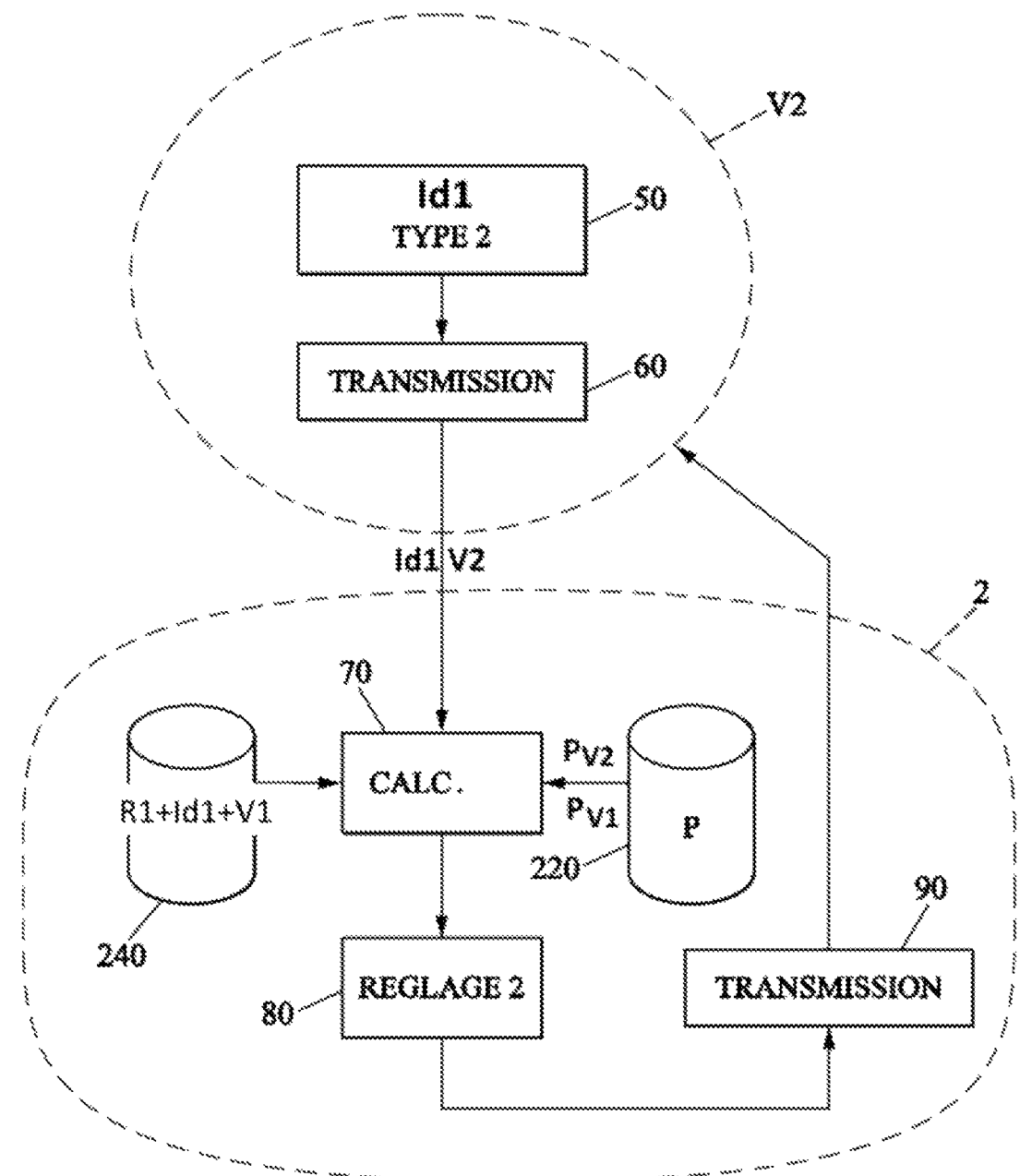
Figure 4:
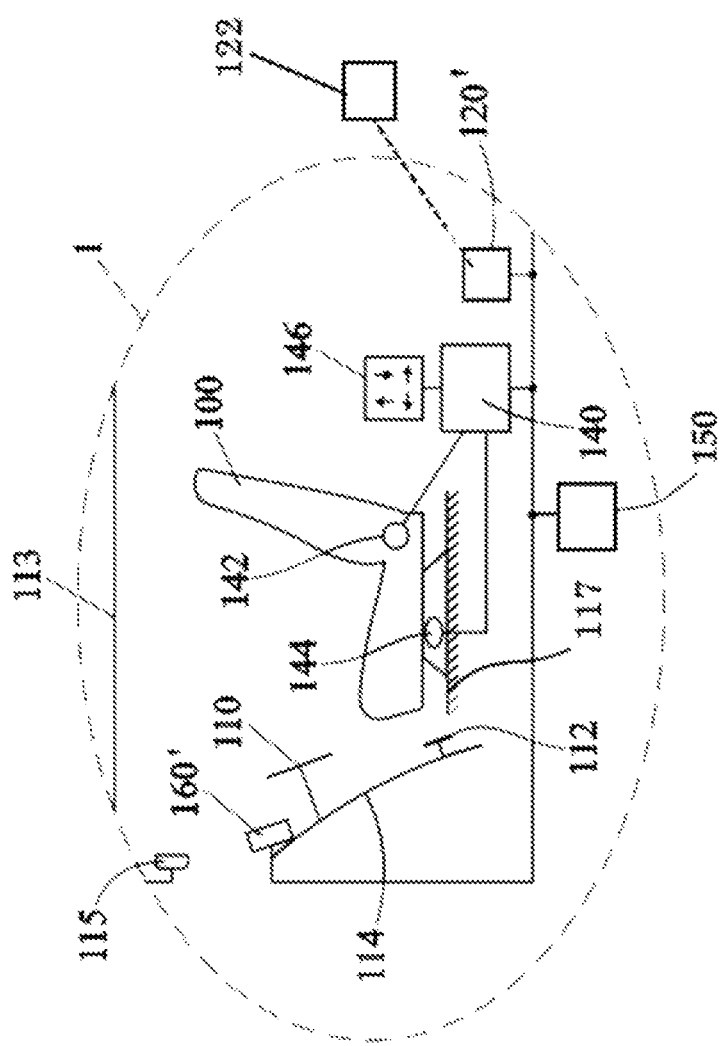
Figure 5:
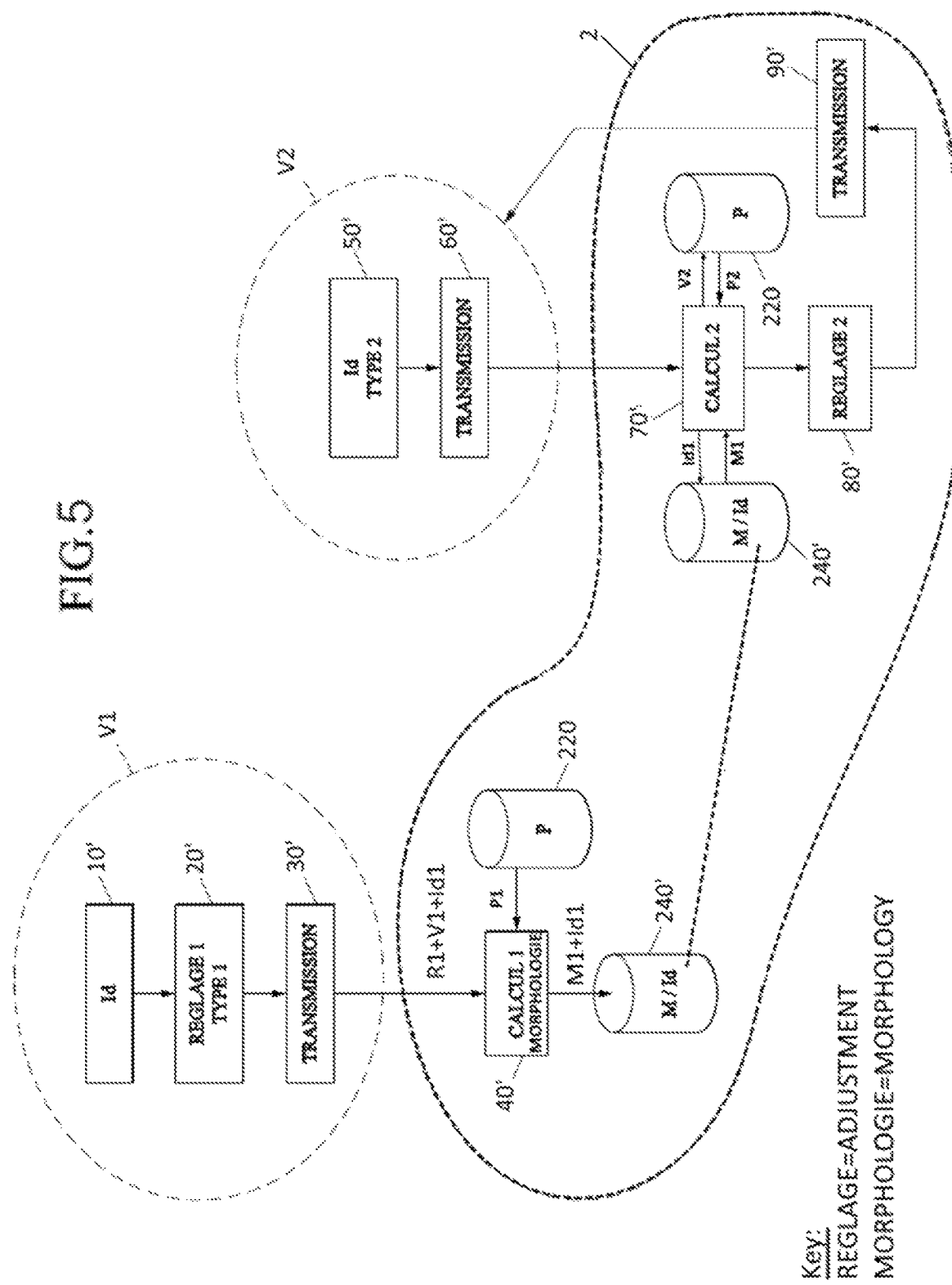

The detailed description particularly refers to the accompanying figures in which:

FIG. 1 schematically represents a vehicle in accordance with the present disclosure and a computing system according to a first embodiment of the present disclosure;

FIG. 2 schematically represents the first steps of a method according to the present disclosure;

FIG. 3 schematically represents additional steps of a method according to the present disclosure;

FIG. 4 schematically represents a vehicle in accordance with the present disclosure showing a second embodiment of the present disclosure; and FIG. 5 schematically represents the steps of a method according to a variant of the present disclosure.

DETAILED DESCRIPTION

The present disclosure applies to different vehicles in a line or fleet of vehicles.

The vehicles comprise seat adjustment means enabling an adjustment of the seats that is at least partly automatic.

Line of vehicles means, for example, different models of vehicles from one automobile manufacturer. Fleet of vehicles means, for example, several lines of vehicles of an operator such as a rental company for example.

The present disclosure proposes allowing the determination of seat adjustments in a new vehicle based on a seat adjustment in a first vehicle.

This determination may be made for example according to tables of correlations between vehicles giving adjustment ratios or, in the examples which follow, either taking into account dimensional data of the passenger compartment of the first vehicle for an identified user, the seat adjustments of this first vehicle for the user, and dimensional data of the passenger compartment of the new vehicle, or using an estimated morphology of the user.

In a first example, the dimensional data taken into account are the dimensions of the seats, the seat/pedal distances, the height of the seat relative to the vehicle floor, the seat/steering wheel distance, and more generally the dimensions useful for defining the seat dimensions and positioning it in the passenger compartment.

FIG. 1 schematically represents an embodiment of the present disclosure wherein the data are transmitted between the vehicles by a communication network, and wherein the calculations necessary for the automatic seat adjustments of the present disclosure are carried out in a remote computer system.

FIG. 1 therefore represents a driving position of a vehicle 1, adapted for implementation of the present disclosure, which comprises, connected together: at least one computer 140 for calculating the adjustments of at least one seat connected to actuators and sensors 142, 144 of the seat.

The vehicle here comprises a device 160 for identifying users of the seat in order to recognize users and enter or recall data for these users.

In the example, the vehicle comprises a communication unit or module 120 for communicating with a remote computer network 2.

The identification device 160 may be of a known type such as a badge reader, an input keyboard, a key receiver, for example a Bluetooth receiver which receives data from a smart phone.

The communication module may be part of a passenger compartment computer, an entertainment module or a module for managing passenger compartment functions, or other.

The seat adjustment module 140 or computer comprises manual adjustment means 146, for example via buttons actuating electric motors, as well as automatic adjustment means for the seat by means of motors. The computer may also include a local memory of users and associated adjustments for direct adjustment of the seats for known users.

The automatic adjustment means are adapted to carry out adjustments based on adjustment data received from the communication unit.

The communication unit comprises means 121 for transmitting and receiving data, for example in the form of a cell phone transmitter/receiver. Through these transmission means the seat adjustment data, the vehicle type identification data, and the identification data of the user(s) will be transmitted to and from the remote computer network which itself is provided with means of communication via the cell phone network.

The vehicle 1 comprises a steering wheel 110, pedals 112, rear-view mirrors 115, a dashboard 114, a floor 117, and a ceiling 113. The position of the various driving accessories and equipment mentioned constitute the passenger compartment dimensional parameters specific to this vehicle.

The dimensional parameters such as the passenger compartment parameters P of all the vehicles of the system of the present disclosure are grouped in a database 220 of a remote computer system 2, for example composed of computer servers of a vehicle manufacturer in the Internet cloud.

The vehicle is configured to transmit its identification, the seat adjustment parameters, and the corresponding user identifier through the communication unit to the computer system 2 which comprises transmission/reception means 310 connected for example to a telephony network of type 3G, 4G, or 5G for example.

This computer system comprises a computing unit 200 accessing the database 220 grouping the dimensional parameters of the passenger compartments of all the vehicles, or grouping ratios between the dimensional data of the vehicles which make it possible to recalculate the seat adjustment data for all the vehicles, which allows retrieving the parameters associated with a vehicle upon receiving the vehicle identifier, for example the position of the pedals 112 relative to the seat 100, dimensions of the seat, position of the steering wheel, etc.

The computing unit also comprises a program provided with a calculation algorithm suitable for calculating seat adjustment data of the second vehicle from the dimensional data of the first and any second vehicle of the system as well as from seat adjustment parameters of the identified user. The same will apply to a third or to any other vehicle associated with the system.

It should be noted that the user identifier may be encoded or made anonymous for reasons of personal data security.

According to FIG. 2, to implement the present disclosure, the user of a first vehicle of a first type, referred to as vehicle V1, obtains a unique identification number (Id) which is stored for example in a passenger compartment computer of the vehicle in a first step 10.

The user then adjusts his or her seat, by manual adjustment using the operating interface 146 acting on the seat motors, or with adjustment assistance possibly based on initial morphological parameters that may be associated with the identifier. When satisfied with the seat adjustments obtained, the user accepts these adjustments.

The seat adjustments taken into account, including the seat position and, if appropriate, additional adjustments for comfort elements such as lumbar support, headrest position, or other, are associated along with the vehicle identifier V1 with the user identifier in a second step 20.

In a third step 30, the vehicle transmits the user identifier Id1, the adjustments R1, and the type of the vehicle V1 to the remote computer system 2 which stores the adjustment data R1, the user identifier Id1, and the type V1 of the vehicle 1 in a database 240.

With reference to FIG. 3, when the user uses a second vehicle V2 of a different type, the user enters his or her identifier, which is associated with the type of the vehicle V2 in a step 50 and transmitted by the vehicle V2 to the computer system in a step 60. The computer system, using the adjustment data R1, the user identifier Id1, and the type of the vehicle V1 which are pulled from database 240, then executes the step 70 of calculating the adjustment data 80 of the seat of vehicle V2 based on passenger compartment dimensional data for vehicles V1 and V2 pulled from database 220.

Database 240 comprising user identifiers may be a database made secure in a conventional manner linked to a server system suitable for communicating with vehicles in an encrypted manner for example.

Thus the system of the present disclosure makes it possible, based on passenger compartment dimensional databases of vehicles from a plurality of lines of an automobile manufacturer and based on adjustment data for a single seat, to provide each vehicle in the lines with customized adjustment data for the user.

The system of the present disclosure thus provides each vehicle connected to the system with customized adjustment data for the identified user based on dimensional data of the vehicle V1, adjustment data of the seat R1 of the vehicle V1, the user identifier, and dimensional data of the vehicles of different lines of the manufacturer or several manufacturers.

The method for automatic adjustment of the present disclosure may comprise:

a step 10 of assigning an identifier to a user, for the first use of a first vehicle, a first step 20 of entering the identifier, adjusting the seat, and storing the seat adjustment data, a step 30 of transmitting the seat adjustment data obtained by the adjustment and the user identifier, to conversion means 40, a step of converting seat adjustment data of the first vehicle into seat adjustment data of the second vehicle, in the conversion means, a step of automatic adjustment of the seat occupied by this user, based on the seat adjustment data of the second vehicle coming from the conversion step.

In the case where the conversion takes into account the passenger compartment data of the vehicles, the conversion uses a calculation program which is provided with an algorithm taking into account the passenger compartment dimensional data of the first vehicle V1 and the passenger compartment dimensional data of the second vehicle V2. As seen above, the conversion means may also be based on ratios applied to the adjustment data as a function of the vehicles.

It should be noted that if the second vehicle is identical to the first, it is obviously not necessary to recalculate the adjustments because the adjustments of the first vehicle apply.

In such case, a step of recognizing the user identifier in the second vehicle precedes the conversion step unless the conversion is carried out and stored for all vehicles in the system, the data of the second vehicle then simply being transmitted for this second vehicle after identification of the user and of the vehicle.

For a system in which the conversion is carried out in a centralized computer system remote from the vehicles, a step of transmitting the seat adjustment data of the second vehicle from the conversion means to the second vehicle and its seat adjustment means will be performed. On the other hand, if the conversion is carried out in the second vehicle, the transmission takes place internally within the vehicle between the conversion means and the seat adjustment means concerned in the vehicle.

To be more precise, the vehicles of different types may be, for example, of different lines, series, or versions from an automobile manufacturer, for example of the compact, sedan, SUV, or utility type. These vehicles, referenced in the manufacturer's or operator's database 220, comprise the internal computers adapted to receive seat adjustment data and to adjust the seats automatically based on these data.

The present disclosure is particularly applicable to driver's seats for which the passenger compartment data are the most fleshed out, but can be applied to passenger seats.

In the embodiment of FIG. 1, the adjustment data and the identifiers are transmitted between the vehicles and a networked computer system by a radio network 300 for the transmission/reception of digital data, and the calculation steps are carried out within the networked computer system.

The advantage of performing calculations based on databases is to offer significant flexibility to the system as product lines or fleets of vehicles evolve, and in the case where the calculation algorithms evolve, to allow further additions to the dimensional data for example.

The system also allows fine-tuning the seat adjustments, as users of the system fine-tune their adjustments or use different vehicles.

Furthermore, the system is suitable for anonymization of user data by replacing user identification data with definition data for equivalent mannequins which can where appropriate be written in a user identification badge and transmitted in place of the user identifier.

The system applies in particular to vehicles comprising a local computerized network for passenger compartment management and which comprises, connected together: at least one computer 140 for calculating the adjustments of at least one seat connected to actuators and sensors 142, 144 of the seat, a device 160 for identifying users of the seat, a communication unit 120 for communicating with a remote computer network.

Each vehicle in the system is then configured to issue a request comprising the identification of a user and the type of this vehicle to the computing means of the computer network, the computing means itself being configured to send back to the vehicle that issued the request:

either, for a known user, the seat adjustment data calculated by the algorithm for the user, the vehicle computer that issued the request being adapted to carry out an automatic adjustment of the seat occupied by the user on the basis of the seat adjustment data sent back;

or, for an unknown user, a request for the transmission of seat adjustment data for this user, the vehicle having issued the request then becoming a first vehicle for which the user should carry out a first seat adjustment.

According to another embodiment shown in FIG. 4, the system of the present disclosure is implemented directly within the vehicles, the seat adjustment calculations of a second vehicle being for example carried out directly in the second vehicle and subsequent vehicles which receive, via a device carried by the user: the user identifier, the dimensional data of the passenger compartment of the first vehicle, and the seat adjustment data of the first vehicle.

The device for computing seat adjustment data is in this case integrated into a module 150 of the vehicles, the server being able in such case to limit itself to transmitting the dimensional data of vehicle V1 to the other vehicles when necessary, the other data being for example grouped in an external device carried by the user.

In this case, the vehicle also comprises a module 120' for exchanging data with the external device 122 carried by the user in order to exchange dimensional and seat adjustment data.

It should be noted, however, that the calculation device may be integrated into the seat adjustment computer or may be a separate module, just as the communication module 120' may be integrated into or coupled to the identification device 160.

The seat adjustment calculations for the seat of the second vehicle are performed in a calculation module 150 of the second vehicle, this module possibly also being inside the seat adjustment computer or the device 120' for exchanging data with an external device 122 worn by the user which may be an active badge, a user's mobile phone, or any other storage device.

The vehicles then have their own passenger compartment dimensional data and a calculation program provided with a calculation algorithm which transposes the adjustments based on the dimensional data of the initial vehicle transmitted by the external device and of the new vehicle without requiring transmission to an external network, which eliminates for example the transmission of user data between vehicles and the network or the storing of user identifier data in an external database.

In this simplified embodiment, in which the user stores his or her seat adjustment data of the first vehicle in an external device, the functions of vehicle dimensional databases may also be integrated into the external device. For example, the external device may be a smart phone which receives these data from a remote computer network by means of an application, the external device serving as an interface between the vehicles and a remote computer network, for example a manufacturer network, for the user's seat adjustment data.

In the embodiment relating to FIG. 5, for the calculations of seat adjustment data the system may use an estimated morphology parameter calculated from the dimensional data of the first vehicle and the seat adjustment data of the first vehicle. In this case, this estimated morphology will be stored with the user identifier in database 240' of FIG. 5.

In this embodiment, the calculations will comprise a first step of calculating an estimated morphology of the user by means of a first calculation program based on the first manual adjustment parameters and on dimensional parameters of the passenger compartment of the first vehicle coming from a first database 220 or integrated into a computer of the vehicle.

In step 10', the user specifies his or her identifier Id1 and then makes adjustments in step 20'. Then, in step 30', the vehicle transmits the user identifier and the adjustment data to the remote system 2.

The method will then comprise, in step 40', a calculation of the estimated morphology of the user by taking into account the dimensional data of the vehicle V1 which come from database 220. At the end of the calculation, the estimated morphology associated with the user identifier is stored in the second database 240'.

When a second vehicle V2 of a type different from the first is used by the user, the second vehicle transmits the type of this vehicle V2 and the user identifier. Upon recognizing the identifier and retrieving the estimated morphology of the user from the second database 240' as well as the dimensional parameters of the second vehicle from the first database 220, a second calculation step 70' calculates second seat adjustment parameters 80' adapted to the second vehicle V2 by means of a calculation program based on the estimated morphology of the user and on the dimensional parameters of the second vehicle.

In the case where the calculation is carried out in a remote computer, the adapted seat adjustments 80' are transmitted in step 90' to the seat computer of the second vehicle for the automatic adjustment of the seat of the second vehicle, the second calculation step as well as the transmission of the adapted seat adjustments being repeated for any new vehicle.

The dimensional parameters useful for determining an estimated morphology comprise, for example, the position of the steering wheel 110 which with the position of the seat enables estimating the arm length, the position of the pedals 112 which allows estimating the leg length depending on the position of the seat, the position of the ceiling 113 and of the dashboard 114, and the dimensions of the seat.

The database 240' grouping the user identifiers and their estimated morphology is in this case a secure database external to the vehicles. It may further comprise additional statistical data for refining the morphology estimates.

The method of the present disclosure may be repeated for any new vehicle in the system of the present disclosure. In the case where the algorithm uses an estimated morphology, the morphology may be further fleshed out when the user uses a new vehicle comprising additional types of adjustments not present in a previous vehicle.

The present disclosure, which is not limited to the examples described, allows improving user comfort without increasing the number of sensors in the passenger compartment, by customizing the position of the seats on a plurality of different vehicles so that that the user automatically obtains suitable seat adjustments when he or she uses a different vehicle of the system of the present disclosure.

Furthermore, the vehicles may comprise a local memory of users and associated adjustments, to allow adjusting the seats according to the user when the user is known.

For an automobile manufacturer, the present disclosure makes it possible to offer personalized comfort to its customers on all makes of its vehicles.

Seat adjustments of a vehicle for different users may be stored in the vehicle. In particular the adjustments of the driver's seat, the positioning of the mirrors or other user comfort functions can be associated with the keys or contact smart cards of specific drivers or an identifier of listed passengers, the adjustments corresponding to these users being remembered when they use the vehicle.

Vehicles may be equipped with sensors to capture a user's position, height, body mass, or other morphological data in order to determine a vehicle seat adjustment and to store these data in the Internet cloud for transmission to an identical vehicle when the user sits down in a new vehicle. However, the use of sensors increases the complexity of the passenger compartment layout and increases the cost of the vehicles.

These solutions are specific to each vehicle model and do not allow automatically adjusting the vehicle accessories and equipment of other models when the user changes vehicles.

The invention claimed is:

1. A system for adjusting seats of different vehicles, wherein the different vehicles comprise means for retrieving a user identifier of a seat user and, wherein the system comprises: means for storing data of a first seat adjustment carried out by the seat user in a first vehicle associated with the user identifier, first conversion means for converting the data of a first seat adjustment into estimated morphology data of the user, storage means for storing the estimated morphology data and the user identifier, and means for transmitting the estimated morphology data and the user identifier to a second vehicle of a different type than the first vehicle, and comprises second conversion means for converting the estimated morphology data into seat adjustment data of the second vehicle so as to offer the user similar comfort for the user in vehicles of different types.

2. The system of claim 1, further comprising means for storing passenger compartment dimensional data of the different vehicles and wherein the passenger compartment dimensional data are used by the first conversion means to calculate the estimated morphology data, the second conversion means being configured to calculate the seat adjustment data of the second vehicle based on the estimated morphology data for the user and the compartment dimensional data of the second vehicle.

3. The system of claim 1, wherein the vehicles comprise means for entering user's morphological data in order to provide the estimated morphology data for the user.

4. The system of claim 1, further comprising means for manually adjusting the seat of the first vehicle so that the first seat adjustment is carried out or modified manually by the user.

5. The system of claim 1, wherein the vehicles comprise a seat adjustment computer connected to actuators and sensors of the seat, the computer comprising manual adjustment means and automatic adjustment means for the seat.

6. The system of claim 1, wherein the vehicles comprise a communication module for communicating with an external network/and or an external device.

7. The system of claim 1, wherein the first and second conversion means are implemented in computing units associated with one or more storage units, for converting the seat adjustment data of the first vehicle into the seat adjustment data for a seat of the second vehicle using the estimated morphology data.

8. The system of claim 7, wherein the storage units are located in a server system remote from the vehicles.

9. A system for adjusting seats of different vehicles, wherein said different vehicles comprise means for retrieving a user identifier of a seat user and wherein the system comprises:
means for storing data of a first seat adjustment carried out by an identified user in a first vehicle associated with said user identifier,
first conversion means for converting seat adjustment data of said first vehicle into estimated morphology data of said user,
means for storing said estimated morphology data and user identifier and means for transmitting said estimated morphology data and user identifier to second conversion means for converting such estimated morphology data into seat adjustment data of a second vehicle,
and wherein the first and second conversion means are implemented in a computing unit associated with one or more storage units, for converting the seat adjustment data of the first vehicle into adjustment data for a seat of the second vehicle using said estimated morphology data and
wherein the computing unit is implemented in a remote computing system remote from the vehicles.

10. The system of claim 9, wherein the one or more storage units are located in a remote server system remote from the vehicles, the remote server system and the remote computing system are grouped together in a remote computer network connected to a communication network in communication with communication units of the vehicles and through which are transmitted vehicle identification data, user identification data, and seat adjustment data, and wherein the remote computing system provides the estimated morphology data calculations, provides calculations of the seat adjustment data of the second vehicle using the estimated morphology data and transmits the seat adjustment data of the second vehicle to the second vehicle via the computer network and the communication network.

11. The system of claim 10, wherein the storage unit comprises a database comprising the dimensional data representative of the passenger compartment and of seats of different types of vehicles, to enable calculating said estimated morphology data and adjustment of the seats of all of the different vehicles based on the adjustment of a seat of a first vehicle.

12. The system of claim 9, comprising means for storing passenger compartment dimensional data of said different vehicles and wherein said passenger compartment dimensional data are used by said first conversion means to calculate said estimated morphology data, said second conversion means being configured to calculate seat adjustment data of said second vehicle based on said estimated morphology data for said user and compartment dimensional data of said second vehicle.

13. The system of claim 9, wherein the vehicles comprise means for entering user's morphological data in order to provide said estimated morphology data for said user.

14. The system of claim 9, comprising means for manually adjusting the seat of the first vehicle so that said first seat adjustment is carried out or modified manually by the user.

15. The system of claim 9, wherein the vehicles comprise a seat adjustment computer connected to actuators and sensors of said seat, the computer comprising manual adjustment means and automatic adjustment means for said seat.

\* \* \* \* \*